Feb. 6, 1923.
G. ORBIN.
CUSHIONING TIRE.
FILED SEPT. 14, 1922.
1,444,265.
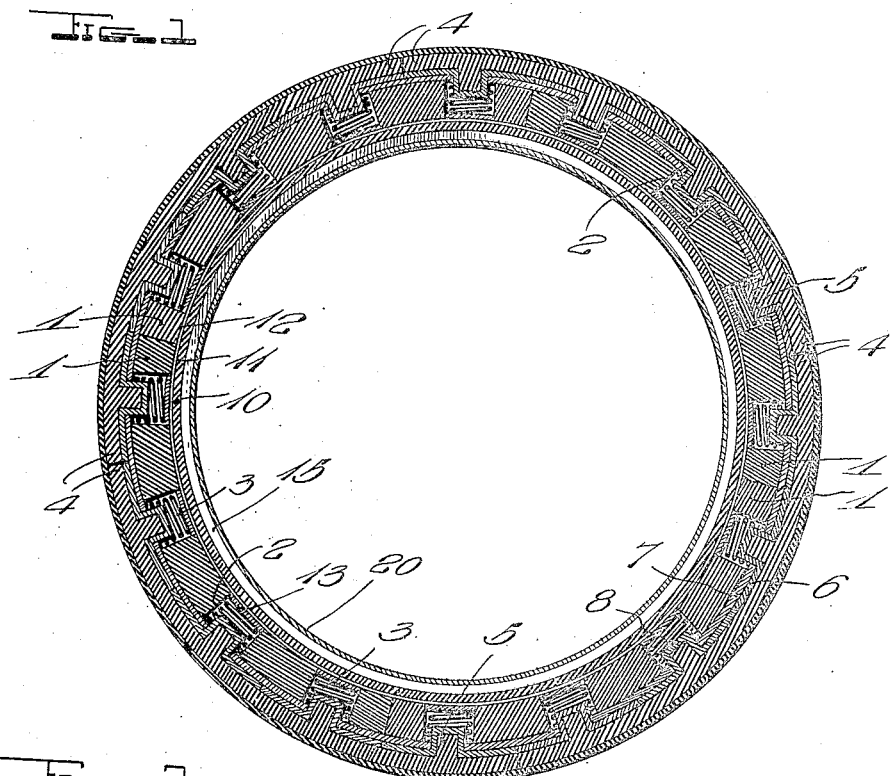
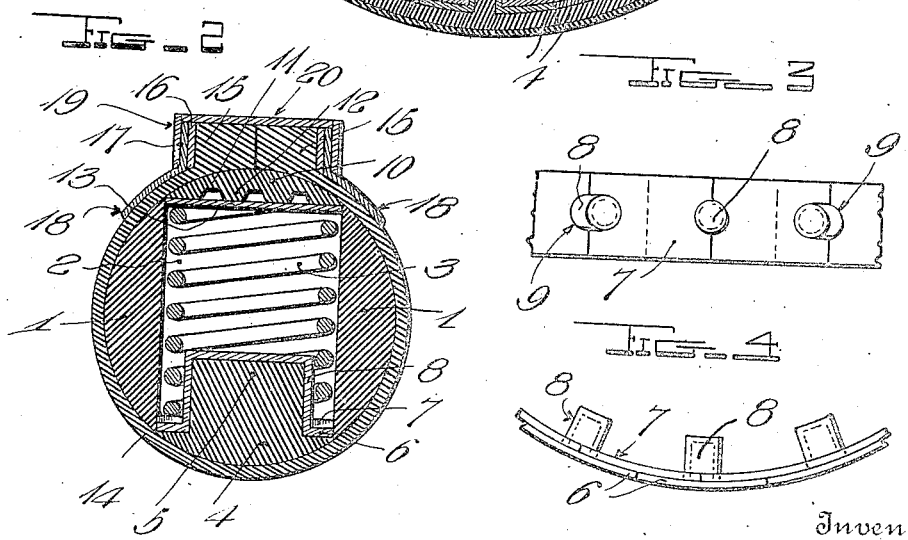
Inventor
George Orbin
By H. R. Wilson
Attorneys
Witness Patented Feb. 6, 1923.

1,444,265

UNITED STATES PATENT OFFICE.

GEORGE ORBIN, OF TUSCALOOSA, ALABAMA, ASSIGNOR OF ONE-THIRD TO OLIVER JUDSON QUINN, OF TUSCALOOSA, ALABAMA.

CUSHIONING TIRE.

Application filed September 14, 1922. Serial No. 588,211.

*To all whom it may concern:*

Be it known that I, GEORGE ORBIN, a citizen of the United States, residing at Tuscaloosa, in the county of Tuscaloosa and State of Alabama, have invented certain new and useful Improvements in Cushioning Tires; and I do declare the following to be a full, clear, and exact description of the invention, such as will enable others skilled in the art to which it appertains to make and use the same.

This invention relates to an improved cushioning tire and one object of the invention is to provide a tire of the cushioning type which will be provided with a core formed of a plurality of sections which can be readily taken apart and put together and which will be enclosed in a casing so that when put together, the various parts will be retained in the assembled state and prevented from moving out of the proper relation with each other.

Another object of the invention is to provide a cushioning tire having the core provided with a body portion having spring receiving pockets therein and to provide a tread portion which will extend about the body portion and be formed of circumferentially extending sections having anchoring elements extending into the pockets and having operative engagement with the springs in the pockets to prevent movement of the tread portions circumferentially of the body portion.

Another object of the invention is to provide the tread portion of the core with facing means which will serve not only as a strengthening and reinforcing facing for the core between the tread and body of the core but further serves as means to retain the tread forming sections in the proper relation to each other.

Another object of the invention is to provide a cushioning tire in which the outer casing which encloses the core will be provided with a bead portion having an improved arrangement of metallic band and rings which will serve to brace the tire and prevent side play which might tend to wrench the tire off of the wheel rim.

This invention is illustrated in the accompanying drawing, wherein:

Figure 1 is a view showing the complete tire in section.

Figure 2 is a transverse sectional view through the tire.

Figure 3 is a view showing a fragment of the reinforcing and anchoring band for the tread portion of the core in elevation.

Figure 4 is a view showing the structure of Fig. 3 in side elevation.

This improved tire is provided with a core which has been formed in a plurality of sections which will be put together and enclosed in an outer casing. The body portion of this core has been formed in a plurality of sections 1 which are formed of rubber and will extend circumferentially of the tire in end to end contact. Each of these sections 1 of the core has been provided with a plurality of radially extending passages forming pockets 2 in which springs 3 will be placed. These springs are coil springs and will serve to yieldably resist compression of the core when the tire is in use but will of course permit sufficient compression for the tire to take up jolts received in going over rough roads. In the form illustrated, the body of the core has been shown formed in four sections but it will of course be understood that any number of sections may be provided as desired. The tread portion of this core is also formed in sections which extend circumferentially of the tire in end to end contact. These tread forming sections 4 are of a suitable length so that they will overlap the end portions of the body-forming sections 1 and each at points intermediate the ends of the body-forming sections. Therefore, when the tread-forming sections are anchored to the body-forming sections as will be hereinafter brought out, the tread-forming sections and body-forming sections will be secured and prevented from having circumferential movement and further they will serve to retain the sections in their proper position. Each of the tread-forming sections 4 has been provided with inwardly extending arms or anchoring elements 5 which are in the form of blocks to extend into the pockets 2. These anchoring elements are of such size that they may fit into the springs 3. A reinforcing and strengthening band is provided between the body of the core and inner face of the tread band. This reinforcing band is formed of metal plates 6 and 7 which extend circumferentially of the tire. The plates 6 are positioned in end to end contact as clearly shown in Fig. 4 and these plates fit against the inner face of the sections 4 which form the tread band. Each of the plates 6 is provided with a cup extension 8 which is of sufficient size to receive the anchoring arm or block 5 as shown in Fig. 2. The plates 7 fit against the plates 6 and are positioned in staggered relation to these plates so that they extend in overlapping relation to the end portions of the plates 6. Each plate 7 has its end portions provided with notches 9 into which the cups 8 will fit. By having the reinforcing band formed of metal plates assembled as shown, the band may serve to reinforce the tread portion of the core but at the same time will have sufficient give to permit the tire to be compressed and take up jolts in going over rough roads. By having the anchoring elements extending into the pockets and within the springs, the tread band is prevented from having transverse movement and therefore the sections which form this tread band cannot move transversely off of the tread base of the body. It will thus be seen that this tire may have the proper compression necessary but at the same time, it will be so formed that the sections which form the body, tread band and reinforcing band may not readily come apart. An inner ring or band 10 which forms a completing portion for the core fits against the inner face of the core body and closes the inner ends of the pockets 2. This ring or band 10 has its core body engaging face provided with grooves 11 which form ribs 12 so that when the tire is in use, this band or ring 10 may have a certain amount of spread or bend transversely without danger of cracking. Plates 13 which will be in the form of disks are provided in the inner ends of the pockets 2 thus providing abutment plates for the inner ends of the springs 3 and preventing the springs from having a tendency to cut into the band 10.

When assembling the tire, the sections forming the body can be put in end to end contact about the ring 10 with the ring 10 and sections 1 positioned in a horizontal position upon a table or other suitable place of assembling. The disks 13 will be put in the pockets and the springs then inserted and the plates 6 and 7 then assembled as shown in Figs. 3 and 4 and put in place about the body with the cups 8 extending into the pockets and within the coil springs. The sections forming the tread band will then be put in place with the anchoring arms or blocks 5 extending into the cups. It will, of course, be understood that if desired the plates 6 can be first placed against the tread band forming sections with the blocks 5 extending into the cups and the plates 7 put in place and the assembled tread band sections and reinforcing band forming plates then put in place about the body of the core. After the core has been assembled, the casing 14 will then be put in place about the core. This casing 14 is thickened as shown at 15 thus providing the casing with a bead forming portion which will permit of the tire being secured upon the rim of a wheel. In order to permit the rim portion of the wheel to obtain a good grip upon the bead portion of the tire casing and hold the casing firmly in place and tightly about the core, there has been provided a plurality of metal rings. Upon opposite sides of the bead, there has been provided metal rings 16 and against these rings fit a second set of rings 17. These rings 17 are provided with outwardly extending flanges 18 which are curved transversely as clearly shown in Fig. 2 and extend to brace the tire upon opposite sides of the bead and prevent the tire from having transverse movement which would permit it to be readily wrenched lose or torn when the tire is subjected to side strain. Other rings 19 fit against the rings 17 and are extended beyond the rings 17 to engage the side edges of a band 20 which will fit upon the rim of the wheel. When the tire is put in place and the rim tightened, the rim will engage the rings 19 and provide clamping means to securely hold the rings in place and hold the tire in place upon the wheel. It will thus be seen that this tire may be very easily assembled and further when desired, it can be readily taken apart and worn-out portions replaced.

I claim:

1. A cushioning tire comprising a core provided with a body of yieldable material having open ended pockets formed therein for extending radially of a wheel, coil springs in said pockets, a tread portion of yieldable material fitting against the tread face of said body and closing the outer ends of said pockets and having anchoring elements rigid with the tread portion and extending from the inner face of said tread into said pockets and into said springs, and an outer casing fitting about said core.

2. A cushioning tire comprising a yieldable core having circumferentially extending sections in end to end contact, each provided with radially extending passages forming pockets, an inner ring fitting against said core and closing the inner ends of said pockets, an outer tread ring of yieldable material fitting against the tread face of said core and formed of circumferentially extending sections in end to end contact with their end portions in overlapping relation to the ends of the core forming sections, anchoring elements extending from said tread ring into said pockets, springs in said pockets about said anchoring elements, and a casing enclosing said core and rings.

3. The structure of claim 2, and a protecting and reinforcing facing for the core engaging face of said tread ring formed of circumferentially extending plates positioned in end to end relation and having cups extending inwardly for fitting about and enclosing said anchoring elements.

4. The structure of claim 2, and a protecting and reinforcing facing for the core engaging face of said tread ring formed of circumferentially extending plates positioned in end to end relation and having cups extending inwardly for fitting about and enclosing said anchoring elements, and strips fitting upon said plates between said cups and having their ends notched to receive the cups and prevent transverse movement of the strips.

5. A cushioning tire comprising a core having sections formed of yieldable material, said core having radially extending pockets and having an unattached tread portion provided with anchoring elements extending into said pockets, springs in said pockets coiled about and slidably receiving said anchoring elements, and a casing enclosing said core.

6. A resilient tire comprising a sectional solid core having sockets formed therein, shock absorbing members working within said sockets, an inner ring and an outer ring engaging said sectional solid core and closing the ends of the sockets and engaging opposite ends of the shock absorbing members, and an enclosing outer casing surrounding the sectional solid core and rings.

7. A resilient tire comprising an outer casing, a sectional solid core within said outer casing, the sections of said core being provided with sockets opening upon opposite faces thereof, shock absorbing members working within said sockets, bearing members engaged in the opposite ends of said sockets, resilient ring members extending around the inner and outer faces of said sectional solid core and over the opposite ends of said sockets, and a rim member for enclosing the edges of said outer casing.

8. A resilient tire comprising an outer casing, a sectional solid core within said outer casing, the sections of said core being provided with sockets extending radially of the tire and open at their ends, shock absorbing members working within said sockets, bearing members engaged in the opposite ends of said sockets, and resilient ring members extending around the inner and outer faces of said sectional solid core and over the opposite ends of said sockets.

9. A resilient tire comprising a sectional core having sockets extended therethrough, shock absorbing springs positioned in said sockets, bearing members for the inner ends of said springs, a resilient inner ring extending around the inner side of said sectional core, sectional outer metallic rings arranged around said sectional core, the sections of the metallic rings being overlapped with respect to one another and with respect to the sections of said core, one of said sectional metallic rings being provided with openings, cup extensions carried by the remaining sectional metallic ring and extending through the openings of the first mentioned metallic ring, said cup extensions projecting into the sockets and springs within the core, and an outer resilient ring enclosing the sectional metallic rings and having extensions resting in said cup projections, said outer casing enclosing the several rings together with the core.

10. A resilient tire comprising a sectional solid core having sockets extending therethrough, shock absorbing springs positioned in said sockets, a bearing member for the inner end of each spring, a resilient inner ring extending around the inner side of said sectional solid core, sectional outer metallic rings arranged around said sectional solid core, the sections of the metallic rings being overlapped with respect to one another and with respect to the sections of said core, one of said sectional metallic rings being provided with openings, cup extensions carried by the remaining sectional metallic ring and extending through the openings of the first mentioned metallic ring, said cup extensions projecting into the sockets and springs within the core, and an outer resilient ring enclosing the sectional metallic rings, and having extensions resting in said cup extensions, an outer casing enclosing the several rings together with the core, said outer casing having enlarged rim edges, and a rim mounting member enclosing the rim edges of said outer casing, said rim mounting member having extensions forming bearings for the inner side portions of said outer casing.

In testimony whereof I have hereunto affixed my signature.

GEORGE ORBIN.